Dec. 20, 1966  H. MÜLLER  3,292,791
ROTARY DISC FILTER DEVICE
Filed Dec. 14, 1964

Inventor:
HANS MÜLLER
By Shoemaker and Mattare
Attys.

United States Patent Office 3,292,791
Patented Dec. 20, 1966

3,292,791
ROTARY DISC FILTER DEVICE
Hans Müller, Erlenbach, Zurich, Switzerland
Filed Dec. 14, 1964, Ser. No. 415,406
Claims priority, application Germany, Dec. 21, 1963,
M 46,888
2 Claims. (Cl. 210—330)

This invention relates to a filter device and particularly to a filter device for rotary disc filters.

It is an object of the present invention to provide a filter device, particularly for rotary disc filters, comprising a shaft and a number of filter elements mounted on said shaft, wherein each of said filter elements comprises a filter cloth, a base sheet and an intermediate layer and wherein radially extending tie members are located over the filter cloth of each filter element and said tie members are inclined with respect to said shaft, one end of each tie member being secured to a spacing ring located above each filter element and the other end of each tie member being provided with a screw-thread over which a clamping means is fitted so as to engage the outer edge of the element to clamp the filter cloth, the base sheet and the intermediate layer together, said clamping means being retained on each of said tie members by means of a nut engageable with the said screw-thread.

Displacement of the clamping means enables the filter element held thereby to be held much more securely since any clearance, and thus any loose connection, is eliminated by the exactly adjustable tightening means of the clamping means. In addition, the filter cloth can be fastened and/or changed more easily.

The invention is applicable to plates having flat or conical bases. Experiments and practice have shown that, by means of the invention, plates with flat or even bases have enhanced stability. Thus, the plates may be made of thinner material without sacrificing strength, since the filter elements are to a certain extent suspended from the tie members.

The invention extends to rotary disc filters provided with the filter device above defined.

An example of the invention is illustrated in the accompanying drawings, in which.

Figure 1:
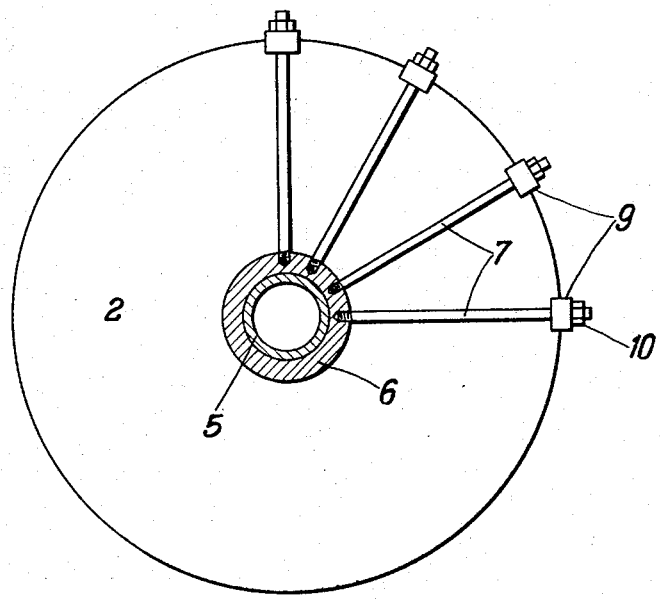
FIG. 1 is a plan view of a filter element with the vertical shaft and spacing ring shown in section.
Figure 2:
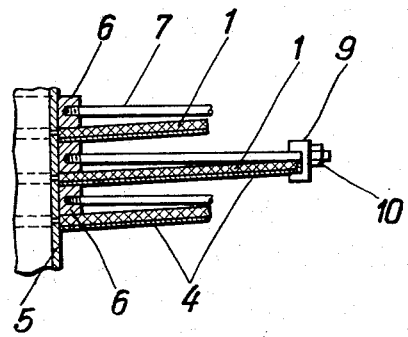
FIG. 2 is a fragmentary vertical section through a column of elements.
Figure 3:
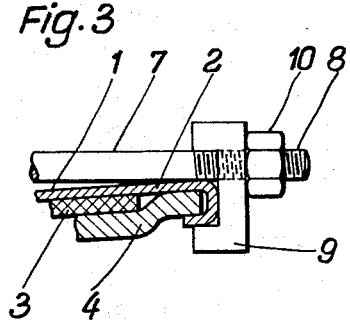
FIG. 3 is a fragmentary view showing the outer portion of the filter element with the tie member and clamping means on an enlarged scale.
Figure 4:
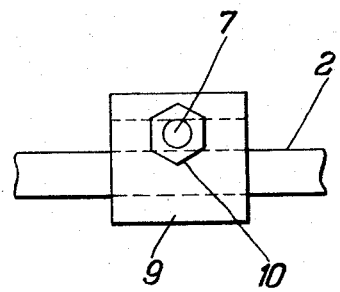
FIG. 4 is a view of FIG. 3 from the outside of the element.

The filter element is pervious only at the top 1, is preferably disc-shaped and, in known manner, comprises a filter cloth 2, a porous intermediate layer 3 and the impervious base sheet 4. It is mounted on a rotary hollow shaft 5 and kept apart from the adjacent filter elements above and below it by spacing rings 6.

A number of, for example six, radially extending tie members in the form of rods 7, wires or the like are fixed in the spacing ring 6 above the filter element, preferably by screwing. Their free ends are provided with a screw-thread 8. Clamping means in the form of a jaw yoke 9 is slid over each rod 7 and adjustably secured thereon by means of a nut 10. Thus, the rods 7 are stretched and the filter cloth 2 simultaneously secured and tightened. The jaw yokes 9 also support the base sheet 4. This makes it possible for the latter to be considerably thinner without the strength of the filter plate suffering.

The rods 7 have the further advantage that when the filter is rinsed out the filter cloth does not need special straightening. When the residue is centrifuged off the filter elements there is less strain on the fabric because it is securely held. It does not tear.

Scraping plates, helical discharge pipes and the like may be fixed to the edges of the elements on or with the aid of the screw-thread 8.

Other forms and embodiments of my invention are possible without departing from the spirit and scope of my invention and I desire, therefore, that only such limitations shall be placed thereupon as are specifically set forth in the appended claims.

I claim:

1. A filter device comprising a shaft; filter elements mounted on said shaft, each of said filter elements comprising a filter cloth, a base sheet and an intermediate layer; a plurality of radially extending tie members located over the filter cloth of each filter element, said tie members being inclined with respect to said shaft; a spacing ring mounted on said shaft above each filter element, wherein one end of each tie member is secured to an associated spacing ring and the other end of each tie member is provided with a screw-thread; clamping means fitted on to each of said tie members at the screw-threaded end thereof, said clamping means engaging an edge of the filter element and serving to clamp said filter cloth, base sheet and intermediate layer of said element together; and a nut provided for engagement with said screw-thread on each of said tie members for securing said clamping means to said tie members.

2. A rotary disc filter including the filter device claimed in claim 1.

No references cited.

REUBEN FRIEDMAN, Primary Examiner.

W. S. BRADBURY, Assistant Examiner.